United States Patent Office 3,240,770
Patented Mar. 15, 1966

3,240,770
PROCESS FOR THE POLYMERIZATION AND CO-POLYMERIZATION OF ALPHA-MONO-OLEFINS
Marcello de Maldé, San Donato Milanese, and Walter Marconi, Sebastiano Cesca, Giorgio Delia Fortuna, and Clemente Franchini, Milan, Italy, assignors to SNAM-Societa per Azioni
No Drawing. Filed May 2, 1962, Ser. No. 191,731
Claims priority, application Italy, May 2, 1961, 650,399/61; Feb. 28, 1962, 4,022/62; Mar. 2, 1962, 4,164/62
2 Claims. (Cl. 260—88.2)

It is an object of the present invention to provide a process for the stereospecific polymerization of monoolefins, in particular for the homopolymerization of monoolefins such as ethylene, propylene, n-butene and the like, as well as for the co-polymerization of their mixtures.

The process is characterized by the use of a two-component catalytic system constituted by:

(1) A salt (inorganic or organic) of a transition metal of groups IV, V, VI or VIII of the Periodic System, in particular titanium, zirconium or vanadium; or of manganese, wherein the metal should have even valency or a valency lower than its maximum possible valency.

(2) An aluminum hydride, simple or substituted. Said hydrides are soluble in aromatic hydrocarbons and can be defined by the general formula AlHXY, where X and Y may be a hydrogen atom, a halogen atom, a secondary aminic radical

wherein R' and R" may be alkyl radicals, aryl radicals, alkyl-aryl radicals or cyclo-alkyl radicals, equal to or different from each other; or a heterocyclic ring containing nitrogen (bonded to aluminum).

Those hydrides may be complexed with substances capable of giving away electrons, of the so-called "Lewis bases" type such as ethers, tertiary amines, tetrahydrofurane, dialkyl sulfides, trialkyl phosphines, etc.

Said second component of the catalytic system is thus a hydride or halo-hydride or amido-hydride of aluminum, simple or complexed with organic molecules. Typical examples thereof are the following:
$AlH_3 \cdot N(CH_3)_3$; $AlH_2Br \cdot N(CH_3)_3$; $(CH_3)_2NAlH_2$; $(C_6H_5)_2NAlHBr$;

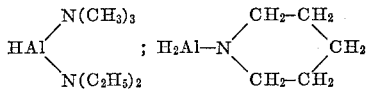

$AlHCl_2 \cdot (C_2H_5)_2O$.

Those compounds are generally easily prepared and some of them are described in literature, see E. Wiberg, Z. Naturf., 6b, 452 (1951), and J. K. Ruff, J.A.C.S., 83, 535 and 2835 (1961); others have been prepared by applicants.

They are all liquid compounds or low-melting solid compounds, soluble in the solvents wherein polymerization is carried out and they afford—over the generally used metal-organic compounds—the further advantage of not being self-inflammable in air and of possessing a much lower reactivity towards compounds containing active hydrogen such as alcohols, primary and secondary amines, inorganic and organic acids. In particular their reaction with water never takes place in an explosive manner. Typical examples of salts of transition metals are $VCl_3$, $TiCl_3$, $ZrCl_4$, $TiCl_4$ oxy- or alcoxy-halides such as $VOCl_3$ or $VO(OC_2H_5)_3$, the acetyl acetonates of trivalent vanadium and of vanadyl (VO"), etc.

The polymerizations are carried out preferably in aromatic inert hydrocarbon solvents such as toluene, benzene, xylenes, since therein are soluble the compounds of aluminum of the present invention; however it is possible also to carry out the polymerizations in inert hydrocarbon solvents of other kind, for instance aliphatic, such as heptane or cyclo-aliphatic, such as cyclohexane.

The polymerization can be carried out in a wide range of pressures and temperatures. The temperature generally may vary from —20° C. to +125° C., but should be preferably contained in a narrower range, generally between +20° C. and +90° C. Sometimes it may be preferable not to raise it beyond 70 and 80° C. Pressure may vary between ordinary pressure and 50 atmospheres.

The duration of polymerization may vary from some hours to some days.

Preferably, monomers free from oxygen, anhydrides and having high purity, are employed.

The two essential components of the catalytic system, from the interaction of which there forms a suspension containing the true active constituent of the catalyst, can be reacted with each other in the absence or presence of the monomer to be polymerized, and it is possible also to make them interact in the polymerizing vessel, or previously apart from the monomer. The preparation of the catalyst can be effected at room temperature, or even by heating, and generally is effected at temperatures of between 0° C. and 80° C., in the above mentioned solvents, in an atmosphere of inert gas and at atmospheric pressure.

The molar ratio, with which the aluminum hydride and the compound of the transition metal are combined with each other in the preparation of the catalyst, may vary in a wide range, according to the number of Al-H bonds and according to the kind of the substituents or of the possible complexants present. Moreover it is a function of the characteristics of structure and of the degree of polymerization to be obtained in the polymer; and it is at any rate between 0.25 and 10 and preferably between 0.5 and 5.

From the polymerization the polymers are obtained in the state of powdery solids, sometimes swelled by the solvent, from which they are liberated by conventional methods.

By employing the catalytic system of the invention, a highly stereospecific polymerization has been obtained of alpha-mono-olefins to yield polymers having elevated crystallinity, as will better appear from the examples to follow. It has also been possible to successfully polymerize mixtures of said mono-olefins, to yield essentially amorphous copolymers.

In the case of copolymerization, the reaction can be carried out in the same molar ratios and in the same temperature ranges and pressure ranges used for homo-polymerizations. If the temperature of the reaction medium increases, the molecular weight of the copolymer produced diminishes.

The preferred range of pressures is between 5 and 30 atmospheres. With increase of pressure, there increases sensibly the average speed of copolymerization and the molecular weight of the copolymer produced. It is possible, therefore, to produce a whole range of copolymers having desired molecular weight, by varying the operating pressure and temperature.

The catalyst as such may be prepared in various manners. The activity of the catalyst prepared depends to a considerable extent on the time of interaction between the components of the catalytic system, when the transition compound employed is soluble in the reaction solvent.

On the other hand it is preferable to make the constituents of a given catalytic system interact for a sufficiently long time (ageing) at a suitable temperature, in order to realize a degree of interaction producing a catalyst which will be as homogeneous and stable as possible during copolymerization.

It has thus been found that durations of interaction of between 5 and 60 minutes, preferably of between 20 and 30 minutes, and temperatures of interaction higher than or equal to those of copolymerization, realize the best conditions of preparation of the instant catalytic system.

Our catalytic system, prepared by ageing as above described, shows it is true, reduced activity compared to a system having the same constituents but not aged; but the composition of the copolymers obtained with the aged or non-aged catalytic system is essentially the same. The formation of homopolymers of the separate monomers used in the mixture of mono-olefins, which are to be copolymerized, is in practice negligible; and the copolymer produced is revealed on X-ray examination to be essentially amorphous.

Generally the average speed of copolymerization is at a maximum for a particular value of the Al transition metal ratio. This ratio varies between 2 and 5 and in general is between 3 and 4. So for instance for the system $VCl_4$ and $HCl_2AlO(C_2H_5)_2$ the preferred value is 3.5.

From a general point of view it can be said that the optimum ratio requires an Al-H bond for every valency of the transition compound.

In general, the higher the excess of the Al compound, the smaller the molecular weight of the copolymer produced. By varying the composition of the mixture of mono-olefins employed, there are correspondingly produced copolymers with different content of monomeric units. Consequently the mechanical properties and the possibilities of use, in practice, can cover an entire vast range of requirements.

But to produce a copolymer having the desired homogenous composition it is necessary to obtain in the liquid reaction medium a given concentration of the monomers (for instance the concentration of saturation corresponds to the equilibrium at a given temperature and pressure) and to keep the concentration at that value during the whole time of polymerization. In fact during the copolymerization the ratio, for instance, between ethylene and propylene in the gaseous phase is much different from that in the liquid phase, since the higher olefines are much more soluble than the lower ones; moreover since ethylene is more reactive than propylene the two monomers do not go in with the copolymer in the same ratio of their concentrations in solution.

Hence in practicing the process of the present invention the attempt has been made to keep the composition of the gas, in equilibrium with the liquid, constant during the whole period of copolymerization. This has been realized by means of blowing the gaseous mixture of the monomers at high space velocity into the solvent that for this purpose contained initially only one single component of the catalytic system. The effluent gases leaving the reactor were continuously analyzed by means of gas-chromatography. On attaining equilibrium conditions, the second component of the catalytic system was introduced, seeing to it that the monomer mixture always flowed in the reactor at high space velocity during the whole period of polymerization. It was thus possible to obtain polymers having a strictly constant composition and independent on the degree of polymerization and of the yield of conversion of the monomers, and this with different catalytic systems and at different pressures. Moreover, in that way one obtains a fair constancy of the polymerization speed. Another way of effecting copolymerization according to the present invention is to conduct the reactions in the absence of a solvent, by employing an excess of the less reactive olefin, for instance conducting the ethylene-propylene copolymerization in an excess of liquid propylene. So it is possible to realize an easier control of the concentrations of the monomers during the course of polymerization.

From the reactor the copolymers are discharged in a state of solution or as colloidal masses constituted by macromolecules with high M.W., essentially amorphous, and free from homopolymers of mono-olefines. Evaluation of the composition of the copolymers produced has been carried out by means of fractionation by protracted extraction (more than 20 hours) with a series of solvents at their boiling temperature. The following were used in the same order of succession as listed: ethyl ether, n-hexane, n-heptane. While the ether and hexane extracts contain totally amorphous copolymers (amorphous on X-ray examination), the heptane extracts and residues contain sometimes fractions of copolymers which show a certain degree of crystallinity, according to the catalytic systems used and to the molar ratios between the monomers adopted; generally they are macromolecules containing longer sequences of methylenic units besides propylenic units.

The composition of the ethylene-propylene copolymers was determined by means of I.R. analysis, basing on the band intensity at 7.25 microns of the methyl groups. The evaluation of average molecular weights was carried out by measuring the intrinsic viscosity in tetralin at 135° C.

The term "yield" of solid polymer is intended in the present description to indicate the ratio by weight between polymer coagulatable with methyl alcohol, and total monomer fed, made equal to one hundred.

The invention will be more fully understood from the following working examples.

*Example 1*

An oscillating autoclave of 250 ml. capacity, previously washed with nitrogen, is charged with 50 ml. of benzene, made anhydrous by distillation on liquid sodium-potassium alloy. Contemporaneously the catalytic mixture is prepared apart, by reacting in a little flask, always in inert atmosphere, 4.25 millimoles of $TiCl_4$ dissolved in 50 ml. of benzene, with 9.5 millimoles of $AlHCl_2 \cdot (C_2H_5)_2O$, which is a product liquid at room temperature, odourless, that is not inflammable spontaneously on contact with air and highly soluble in aromatic hydrocarbons. As the chlorohydride is being fed into the flask, one notes the formation of a fine suspension. The whole is kept under stirring for 30 minutes at room temperature; whereafter it is fed by suction into the autoclave. This is heated up to 60° C. and is pressurized with 13 atmospheres of ethylene free from oxygen. The pressure falls in 30 minutes' time by 8 atmospheres. Then further ethylene is fed up to a pressure of 35 atm.; and the reaction is allowed to proceed for 56 hours at 60° C.; whereafter the pressure is of 3 atm. The autoclave is cooled down; and the polymer is discharged. It has a granular appearance and is ground finely and refluxed with methyl alcohol and hydrochloric acid to liberate it from catalyst residues. It is then washed with methyl alcohol and is dried under vacuum at 70° C. There are obtained 14.3 g. of polymer completely soluble in tetralin and with a crystallinity, determined by means of X-rays, of 86%.

*Example 2*

Into an oscillating autoclave of 250 ml. capacity there are charged 50 ml. of anhydrous benzene and the suspension to be catalyzed, prepared by reacting for 40 minutes at room temperature 3.0 g. of $AlHCl_2 \cdot (C_2H_5)_2O$ and 0.89 g. of $TiCl_3$ (violet crystalline), in 50 ml. of benzene. Then 25 g. of ethylene are charged and the whole is allowed to react for 40 hours at 70° C. There are obtained 10 g. of polymer, which was purified and dried. The crystallinity was 87%.

*Example 3*

Into an oscillating autoclave of 250 ml. capacity there are placed 50 ml. of anhydrous benzene and the catalyst suspension as prepared by reacting at room temperature for 40 minutes, 9.37 millimoles of $AlHCl_2\cdot(C_2H_5)_2O$ with 3.13 millimoles of crystalline $TiCl_3$ (alpha-modification), in 50 ml. of benzene. Then 25 g. of dry propylene free from oxygen are charged; and reaction is allowed to proceed for 60 hours at 70° C. There are obtained 17 g. of white polymer, powdery, having a crystallinity of 67.5%.

Example 4

Into a rotating autoclave of 50 ml. capacity there are charged 200 ml. of anhydrous benzene and the catalyst obtained by reacting a solution of 25.8 millimoles of $AlHCl_2\cdot(C_2H_5)_2O$ with a solution of 8.93 millimoles of $TiCl_4$. There are then fed into the autoclave 65 g. of propylene; and reaction is carried on for 24 hours at 70° C. There are obtained 2.6 g. of polymer having a crystallinity of 35%.

Example 5

Into an oscillating autoclave of 250 ml. capacity there are introduced 50 ml. of benzene and a suspension obtained by reacting 25 g. of $AlHCl_2\cdot(C_2H_5)_2O$ with 0.77 g. of crystalline $TiCl_3$ for 30 minutes at room temperature, in 50 ml. of benzene. At this time, there are introduced into the autoclave 31 g. of a propylene-ethylene mixture wherein the molar ratio $C_3H_6/C_2H_4$ is 3, and the whole is heated to 70° C. for 60 hours. There are obtained 12.3 g. of ethylene-propylene copolymer which on infrared analysis shows a content of propylenic units of about 50%.

Example 6

Into an oscillating autoclave of 1000 ml. capacity previously deaerated and heated up to 85° C., there are introduced 22 millimoles of $VCl_3$ and 55 millimoles of $HCl_2\cdot Al\cdot(C_2H_5)_2O$ suspended in 250 ml. of toluene. These are allowed to interact previously at room temperature for 20 minutes' time. Into the autoclave there is then introduced ethylene, keeping the pressure at 20 atm. One notes at once a rise of temperature up to 106° C. The polymerization is made to go on under these conditions for 1 hour. At the end of the test there are collected 23.2 g. of white and powdery polythene which shows crystallinity, upon X-ray examination, of 74%, and intrinsic viscosity—measured in tetralin at 135° C.—equal to 3.8 dl./g. corresponding to a $$M.W._v = 186,000$$

Example 7

In a flask of 500 ml. capacity, kept in inert atmosphere, there are made to interact for 15 minutes at room temperature 19 millimoles of alpha-$TiCl_3$ with 9 millimoles of $HBrAlN(CH_3)_2$ in 250 ml. of anhydrous toluene. Then the suspension is siphoned into a shaking autoclave of 1000 ml. capacity, previously deaerated and heated up to 80° C. There are successively introduced into the autoclave 65 g. of propylene, while the pressure rises up to 12 atmospheres. The polymerization is made to go on for 18 hours; whereafter there are collected, by coagulation from methanol containing 5% of HCl, 4.3 g. of polymer showing an X-ray crystallinity of 62% and an intrinsic viscosity—measured in tetralin at 135° C.—equal to 1.74 dl./g. corresponding to a $M.W._v = 270,000$.

Example 8

Into a shaking autoclave of 500 ml. capacity, previously deaerated and heated up to 75° C., there is siphoned a suspension prepared by interacting at room temperature 10 millimoles of alpha-$TiCl_3$ and 20 millimoles of $HCl_2AlN(CH_3)_3$ in 250 ml. of anhydrous toluene for 20 minutes. Then into the autoclave there are introduced 73 g. of propylene, while the pressure rises to 9 atm. The polymerization goes on for 3 hours; whereafter there are collected 1.5 g. of polymer showing an X-ray crystalinity of 79% and an intrinsic viscosity equal to 4.08 dl./g. corresponding to a $M.W._v = 750,000$.

Example 9

Into a shaking autoclave of 500 ml. capacity previously deaerated and heated up to 65° C., there is introduced a suspension prepared by interacting at room temperature for 20 minutes 8 millimoles of alpha-$TiCl_3$ with 8 millimoles of $H_2Al\cdot N(CH_3)_2$ in 200 ml. of anhydrous toluene. Then into the autoclave are introduced 62 g. of propylene, while the pressure rises to 10 atm. The polymerization is conducted for 5 hours, whereafter there are collected 26.4 g. of white soft polymer showing an X-ray crystallinity of 66% and an intrinsic viscosity of 3.32 dl./g. equivalent to a $M.W._v = 605,000$.

Example 10

In a deaerated flask of 500 ml. capacity there are interacted for 20 minutes and at room temperature, 12.7 millimoles of $VCl_3$ with 25.4 millimoles of $$HCl_2Al\cdot(C_2H_5)_2O$$

in 250 ml. of anhydrous toluene. The suspension is then introduced into a shaking autoclave of 1000 ml. capacity previously deaerated and heated up to 80° C.; successively there are introduced also 68 g. of propylene while pressure rises up to 7.5 atm. The polymerization is conducted for 4 hours; whereafter there are collected, by coagulation from methanol, containing 5% of HCl, 6 g. of white granular polymer, showing an X-ray crystalinity of 75%. The intrinsic viscosity measured in tetralin at 135° C. is $[\eta] = 1.40$ dl./g., equivalent to an average viscosimetric molecular weight $M.W._v = 205,000$.

Example 11

Into a shaking autoclave of 1000 ml. capacity previously deaerated and heated up to 70° C., there is introduced a suspension prepared by interacting at room temperature for 20 minutes 8.4 millimoles of $TiCl_3$ (obtained by reduction of $TiCl_4$ with aluminum powder at high temperature and containing 4.5% of Al in solid solution) with 8.4 millimoles of $H_2Al\cdot NC_5H_{10}$ in 250 ml. of anhydrous toluene. Successively there are introduced into the autoclave 63 g. of propylene, while the pressure rises to 12 kg./sq. cm. The polymerization goes on for 5 hours; whereafter there are collected 43.6 g. of white solid polymer showing an X-ray crystallinity of 51% and a $[\eta] = 1.96$ dl./g. equivalent to $M.W._v = 310,000$.

Examples 12 to 15

Into an autoclave of 500 ml. capacity equipped with magnetic stirring, previously deaerated and kept at the temperature of 70° C., there is introduced a suspension of $VCl_3$ (12.8 millimoles) and $HCl_2AlO(C_2H_5)_2$ (25.6 millimoles) in 250 ml. of benzene, prepared at room temperature by interacting the components for about 20 minutes. Subsequently the suspension is saturated with a mixture of propylene and ethylene introduced with space velocity of 50 Nl./h. and at the pressure of 20 kg./sq. cm. The mixture of the monomers is taken from an autoclave that acts a tank and that is kept at 160° C.; suitable pressure reducers connect the tank with the reactor. The copolymerization tests are conducted for 40 minutes by making the monomer mixture flow continuously through the catalytic suspension. By coagulation from methanol containing 5% of HCl there are collected the copolymers produced; they have an appearance of non-vulcanized rubber and on X-ray examination they appear to be essentially amorphous. In the following tabulation there are collected the characteristics of ethylene-propylene co-polymers produced under comparable conditions as above specified and with the only variant of the propylene/ethylene molar ratio in the monomer mixture employed ($R_m$).

(150 millimoles/liter) in 150 ml. of anhydrous benzene. The components of the catalytic suspension are previously

TABLE I

| Examples | $R_m$ [C3]/ [C2] | Yield, g. | C2 on the crude, percent | Fractionation of the Copolymer | | | | | | | |
|---|---|---|---|---|---|---|---|---|---|---|---|
| | | | | Ether extract, percent | [η] | Hexane extract | | Heptane extract | | Residue | |
| | | | | | | Percent | [η] | Percent | [η] | Percent | [η] |
| 1 | 3.8 | 9.5 | 28.1 | 75.0 | 1.23 | 19.7 | 4.20 | 5.3 | 3.32 | 0 | |
| 2 | 2.4 | 8.0 | 51.2 | 63.6 | 1.36 | 26.8 | 3.25 | 9.8 | 2.60 | 0 | |
| 3 | 1.6 | 18.5 | 60.6 | 50.0 | 1.96 | 21.4 | 3.04 | 11.9 | 3.45 | 16.9 | 4.90 |
| 4 | 0.94 | 11.4 | 80.5 | 23.8 | 0.86 | 27.2 | 2.72 | 49.0 | 4.08 | 0 | |

*Examples 16 to 18*

To evidence the influence of the variation of composition of the catalytic system upon the process claimed, a series of tests has been carried out with different ratios Al/V in the catalytic suspension.

The apparatus and the operating techniques adopted are those of the preceding examples. Moreover, a mixture of monomers was used having a propylene/ethylene molar ratio equal to 4, and a temperature of 70° C., a pressure of 20 kg./sq. cm. and a concentration of VCl3 equal to 63 millimoles/liter was employed. Before starting the copolymerization the components of the catalytic system are made to interact at 70° C. for 15 minutes.

The results obtained are tabulated in Table II.

made to interact at room temperature for 15 minutes. Then there are introduced into the autoclave 52 g. of a propylene-ethylene mixture having molar ratio 5.1. The polymerization is conducted for 90 minutes. At the end there are collected 5.1 g. of copolymer soluble in part in the solvent of reaction and having gummy appearance. It contains 61% by weight of ethylene.

*Example 22*

Operating as described in the preceding example one polymerizes 60 g. of a propylene-ethylene mixture having molar ratio of 5.1, with a catalytic suspension of VOCl3— (60 millimoles/liter) and H2AlN(CH3)2 (100 millimoles) in 150 ml. of anhydrous benzene. In 150 minutes there

TABLE II

| Examples | Al/V | Yield, g. | Polymer time, min. | C2 on the crude, percent | Fractionation of the Copolymer | | | | | | | |
|---|---|---|---|---|---|---|---|---|---|---|---|---|
| | | | | | Ether extract | | Hexane extract | | Heptane extract | | Residue | |
| | | | | | Percent | [η] | Percent | [η] | Percent | [η] | Percent | [η] |
| 5 | 3 | 14 | 85 | 39.0 | 64.5 | 0.60 | 21 | 1.72 | 14.5 | 1.14 | 0 | |
| 6 | 2 | 18 | 40 | 38.9 | 53.3 | 0.94 | 35.6 | 3.08 | 6.1 | 6.55 | 2.1 | |
| 7 | 1 | 11.3 | 40 | 39.4 | 73 | 1.85 | 22 | 2.85 | 5 | 3.02 | 0 | |

*Example 19*

Operating with the apparatus described in Example 1, one introduces into the autoclave equipped with magnetic stirring 0.67 g. of VCl3 suspended in 220 ml. of benzene together with 2.5 ml. of Cl2AlO(C2H5)2, Al/V ratio=3. After having interacted the components of the suspension for about 30 minutes at 70° C., one saturates with a mixture of propylene and ethylene having $R_m$=3.5, keeping the temperature constant at 70° C. and the pressure at 20 atm. The copolymerization is protracted for 90 minutes; whereafter there are collected by coagulation from methanol containing 5% of HCl, 4 g. of copolymer completely soluble in benzene and totally amorphous on X-ray examination. It reveals on I.R. analysis an ethylene content of 41%. If subjected to extraction by ethyl ether at boiling temperature 94% is soluble in this solvent; while the remaining 6% is soluble in boiling n-hexane.

*Example 20*

Into a rocking autoclave of 250 ml. capacity, deareated and heated up to 70° C., there was introduced a suspension of 10.2 millimoles of VCl3 and 12.6 millimoles of H2AlN(CH3)2 in 150 ml. of benzene. Subsequently into the autoclave there are charged 45 g. of a gaseous mixture of propylene and ethylene with molar ratio $$C_3/C_2=5.5$$

After protracting the polymerization for 120 minutes one collects 3.1 g. of copolymer revealing a content by weight of ethylene equal to 82%.

*Example 21*

Into a rocking autoclave of 250 ml. capacity previously deaerated and heated up to 70° C., there is introduced a suspension of VOCl3 (50 millimoles/liter) and $$HCl_2AlO(C_2H_5)_2$$

are produced 7.5 g. of gummy copolymer partly soluble in the solvent of reaction and revealing an ethylene content equal to 61%.

*Example 23*

In a manner analogous to that described in the preceding examples there are polymerized 34 g. of a propylene-ethylene mixture having molar ratio 2.7, with a catalytic suspension of 50 millimoles/liter of VO(OC2H5)3 and 150 millimoles/liter of HCl2AlO(C2H5)2 in 150 ml. of anhydrous benzene. In 120 minutes are produced 4.2 g. of a copolymer that on analysis shows an ethylene content of 82% by weight.

*Examples 24 to 28*

Into an autoclave of 700 ml. capacity equipped with a rotary stirrer with central shaft, previously deaerated and kept at the temperature of 75° C. by means of a jacket in which a fluid circulates, there is introduced a solution of VCl4 (38 millimoles/liter) in 250 ml. of benzene. After having attained thermal equilibrium the solution is saturated under agitation with a mixture of propylene and ethylene at the velocity of 50 Nl./h. and at the pressure of 20 kg./sq. cm. The mixture of the monomers, that has a molar propylene-ethylene ratio equal to 4, is taken from an autoclave acting as a tank and that is kept at 160° C. On attaining the saturating equilibrium one injects a concentrated solution of $$HCl_2AlO(C_2H_5)_2$$

in benzene. There occurs rapid reaction with the VCl4, development of heat and beginning of the copolymerization. Contemporaneously the monomer mixture is insufflated into the catalytic suspension with elevated space velocity. This current of gas flows during the whole time of copolymerization. The duration of the tests is varied with the varying of the Al/V ratio adopted for the catalytic system: in fact according to the quantity of $HCl_2AlO(C_2H_5)_2$ introduced, the $VCl_4$ undergoes different degrees of reduction and originates different catalytic activities. In the Table III there are tabulated the results of copolymerizations conducted under comparable conditions, according to what is specified above, and using different Al/V ratios. After coagulation for methanol, the copolymers appear as non-vulcanized rubber and on X-ray examination they appear to be essentially amorphous.

mers is taken from an autoclave, acting as a tank and kept at 160° C. Suitable pressure reducers connect the tank with the reactor. Successively there are injected 23.3 millimoles of $HCl_2AlO(C_2H_5)_2$ and one continues making the gaseous curernt of the monomers flow with a velocity of 60 Nl./h. After 56 minutes of polymerization there are collected 11 g. of copolymer, soluble to great extent in the reaction solvent and having the appearance of an elastomer after coagulation from methanol. On I.R. analysis it shows a content of ethylene of 41% by weight.

TABLE III

| Examples | Al/V | Time, min. | Yield, g. | $C_2$ on the crude, percent | Fractionation of Copolymers | | | | | | | |
|---|---|---|---|---|---|---|---|---|---|---|---|---|
| | | | | | Ether extract | | Hexane extract | | Heptane extract | | Residue | |
| | | | | | Percent | [η] | Percent | [η] | Percent | [η] | Percent | [η] |
| 15 | 1.5 | 45 | 4 | 55 | 83 | 0.4 | 17 | 1.4 | 0 | --- | --- | --- |
| 16 | 2.5 | 12 | 6.1 | 47 | 79 | 0.5 | 21 | 2.1 | 0 | --- | --- | --- |
| 17 | 3.5 | 20 | 14.3 | 55 | 70 | 0.6 | 14 | 3.3 | 11 | 3.6 | 5 | 3.3 |
| 18 | 4.5 | 20 | 10.5 | 45 | 68 | 1.0 | 21 | 3.8 | 11 | 4.7 | 0 | --- |
| 19 | 6 | 22 | 5.2 | 50 | 61 | 0.9 | 18 | 2.6 | 14.5 | 2.8 | 6.5 | --- |

*Example 29*

Into a rocking autoclave of 250 ml. capacity, previously deaerated and heated up to 70° C. there is introduced a catalytic suspension formed of 6 millimoles of $VCl_4$ and 7.2 millimoles of $H_2AlNO_5H_{10}$ in 150 ml. of benzene after previous interaction of the two components for 20 minutes at room temperature. Immediately thereafter, there are introduced 47 g. of a gaseous propylene-ethylene mixture having the molar $C_3/C_2$ ratio 5.3. The polymerization is conducted for 80 minutes; whereafter one discharges the monomers that have not reacted and one coagulates the copolymer produced from methanol containing 5% of HCl. One obtains 9.3 g. of copolymer having the appearance of non-vulcanized rubber and revealing a content of ethylene of 72% by weight.

*Example 30*

Adopting an apparatus and a manner of operation identical to those described in the preceding example, one polymerizes 62 g. of a propylene-ethylene mixture, having the molar ratio $C_3/C_2=5.5$ with 6 millimoles of $VCl_4$ and 18 millimoles of $HBr_2AlO(C_2H_5)_2$ in 100 ml. of benzene at 70° C. After 120 minutes one collects 9.5 g. of essentially amorphous copolymer, partly soluble in the reaction solvent and revealing a content of ethylene of 50% by weight.

*Example 31*

Into a rocking autoclave of 250 ml. capacity there are introduced 6.8 millimoles of $VCl_4$; and 17 millimoles of $MCl_2AlN(CH_3)_3$ in 150 ml. of benzene, after having interacted the two components for 20 minutes at room temperature. One heats the autoclave to 70° C.; and subsequently introduces 52 g. of a propylene-ethylene mixture having $C_3/C_2=5.5$. The polymerization is protracted for 110 minutes; and at the end one collects 10.7 g. of a product of gummy appearance partly soluble in the reaction solvent and revealing a content of ethylene of 54% by weight.

*Example 32*

Into an autoclave of 500 ml. capacity with magnetic agitation, previously deaerated and kept at the temperature of 70° C., there is introduced a suspension of alpha-$TiCl_3$ (9.3 millimoles) in 210 ml. of anhydrous benzene. After attaining thermal equilibrium one insufflates under agitation a stream of propylene and ethylene, having the molar ratio 3.1 at a pressure of 20 kg./sq. cm., until the saturating equilibrium is attained. The mixture of mono-

*Example 33*

Into an autoclave with rocking, of 250 ml. capacity, deaerated and heated to 50° C., there is introduced a catalytic suspension of 40 millimoles/liter of $TiBr_4$ and 100 millimoles/liter of $HCl_2AlO(C_2H_5)_2$ in 120 ml. of benzene anhydrous, after previous interaction of the components at room temperature for 15 minutes. Then into the autoclave there are charged 60 g. of a gaseous propylene-ethylene mixture having molar ratio 4.7 while the pressure rises to 30 kg./sq. cm. After 40 minutes of polymerization one coagulated from methanol the elastomer produced obtaining a yield of 12.5% on the monomers introduced. The copolymer obtained proves to be soluble for 69% in hot n-hexane: the hexane extract reveals a content of ethylene of 65% while the residue contains 80% of ethylene.

We claim:

1. A process for the preparation of highly crystalline homo-polymers and amorphous co-polymers of alpha-mono-olefins selected from the group consisting of propylene and mixtures of propylene and ethylene, comprising contracting said mono-olefins with a catalyst system comprising (1) a salt of a transsition metal chosen among the metals of groups IV, V, VI and VIII of the Periodic System and manganese; (2) a substituted aluminum hydride, soluble in aromatic hydrocarbons, having the general formula AlHXY, wherein X is selected from the group consisting of halogen atoms, secondary amine radicals

(wherein R' and R" are selected from the group consisting of alkyl, aryl, alkylaryl and cycloaryl radicals) and heterocyclic radicals containing a nitrogen atom and bound to the aluminum atom through said nitrogen atom, and Y is selected from the group consisting of hydrogen atoms, halogen atoms, secondary amine radicals

(wherein R' and R" are selected from the group consisting of alkyl, aryl, alkylaryl, and cycloaryl radicals), and heterocyclic radicals containing a nitrogen atom and bound to the aluminum atom through said nitrogen atom, said substituted aluminum hydride being complexed with organic molecules capable of forming therewith addition compounds and of the type defined as "Lewis bases," the soluble substituted aluminum hydride being chosen among complexed mono- and di-halo-hydride.

2. A process for the preparation of highly crystalline homo-polymers and amorphous co-polymers of alpha-mono-olefins selected from the group consisting of propylene and mixtures of propylene and ethylene, comprising contacting said mono-olefins with a catalyst system comprising (1) a salt of transition metal chosen among the metals of groups IV, V, VI and VIII of the Periodic System and manganese; (2) a substituted aluminum hydride, soluble in aromatic hydrocarbons, having the general formula AlHXY, wherein X is selected from the group consisting of halogen atoms, secondary amine radicals

(wherein R' and R" are selected from the group consisting of alkyl, aryl, alkylaryl and cycloaryl radicals) and heterocyclic radicals containing a nitrogen atom and bound to the aluminum atom through said nitrogen atom, and Y is selected from the group consisting of hydrogen atoms, halogen atoms, secondary amine radicals

(wherein R' and R" are selected from the group consisting of alkyl, aryl, alkylaryl, and cycloaryl radicals), and heterocyclic radicals containing a nitrogen atom and bound to the aluminum atom through said nitrogen atom, the soluble substituted aluminum hydride being a halo-amino-hydride.

References Cited by the Examiner

UNITED STATES PATENTS 3,065,220   11/1962   McManimie et al. ___ 260—94.9

FOREIGN PATENTS 809,717   3/1959   Great Britain.

JOSEPH L. SCHOFER, *Primary Examiner.*